United States Patent
Techer et al.

(10) Patent No.: US 11,826,939 B2
(45) Date of Patent: Nov. 28, 2023

(54) RESIN INJECTION REGULATOR, RESIN INJECTION CIRCUIT AND ASSOCIATED METHODS

(71) Applicants: SAFRAN AIRCRAFT ENGINES, Paris (FR); SAFRAN, Paris (FR)

(72) Inventors: Marc-Emmanuel Jean François Techer, Paris (FR); Nicolas Cambyse Ashtari, Paris (FR); Raoul Jaussaud, Paris (FR); Benoit Bazin, Audrieu (FR); Thierry Chauvin, Boutigny sur Essonne (FR); Olivier Foussard, Etiolles (FR); Nate Gravelle, Amesbury, MA (US); Adrien Touze, Saint Maurice Montcouronne (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 346 days.

(21) Appl. No.: 15/891,888

(22) Filed: Feb. 8, 2018

(65) Prior Publication Data
US 2018/0222101 A1    Aug. 9, 2018

Related U.S. Application Data
(60) Provisional application No. 62/457,106, filed on Feb. 9, 2017.

(51) Int. Cl.
*B29C 45/77*    (2006.01)
*B29C 70/48*    (2006.01)
(Continued)

(52) U.S. Cl.
CPC ............. *B29C 45/77* (2013.01); *B29C 45/02* (2013.01); *B29C 45/82* (2013.01); *B29C 70/48* (2013.01);
(Continued)

(58) Field of Classification Search
CPC .......... B29C 45/77; B29C 70/48; B29C 45/02
See application file for complete search history.

(56) References Cited

U.S. PATENT DOCUMENTS 3,618,171 A  * 11/1971 Zecher .............. B01F 35/8822
                                                     141/105
4,810,444 A    3/1989 Alberino et al.
(Continued)

FOREIGN PATENT DOCUMENTS

CN    103561942 A     2/2014
JP     02125709 A  *  5/1990 ............. B29C 45/77
(Continued)

OTHER PUBLICATIONS

Machine Translation WO2013068666 (Year: 2013).*
(Continued)

*Primary Examiner* — Matthew J Daniels
*Assistant Examiner* — Wayne K. Swier
(74) *Attorney, Agent, or Firm* — Womble Bond Dickinson (US) LLP

(57) ABSTRACT

The invention relates to a resin injection regulator for a resin injection circuit in a mould for producing a composite part, in particular a turbine engine composite part, characterised in that it comprises at least one vessel which is connected to said circuit and inside of which a movable wall means can be moved in a sealed manner, said movable wall means defining in said vessel a first cavity which forms a container for accumulation of resin and is designed to be connected to at least one part of said circuit, and a second cavity which is designed to be connected to a source of pressurised fluid, said movable wall means being designed to be urged by the pressurised fluid with which the second cavity is supplied in order to exert a pressure on the resin contained in the first cavity by isolating said resin from said fluid.

16 Claims, 6 Drawing Sheets

Figure 1:
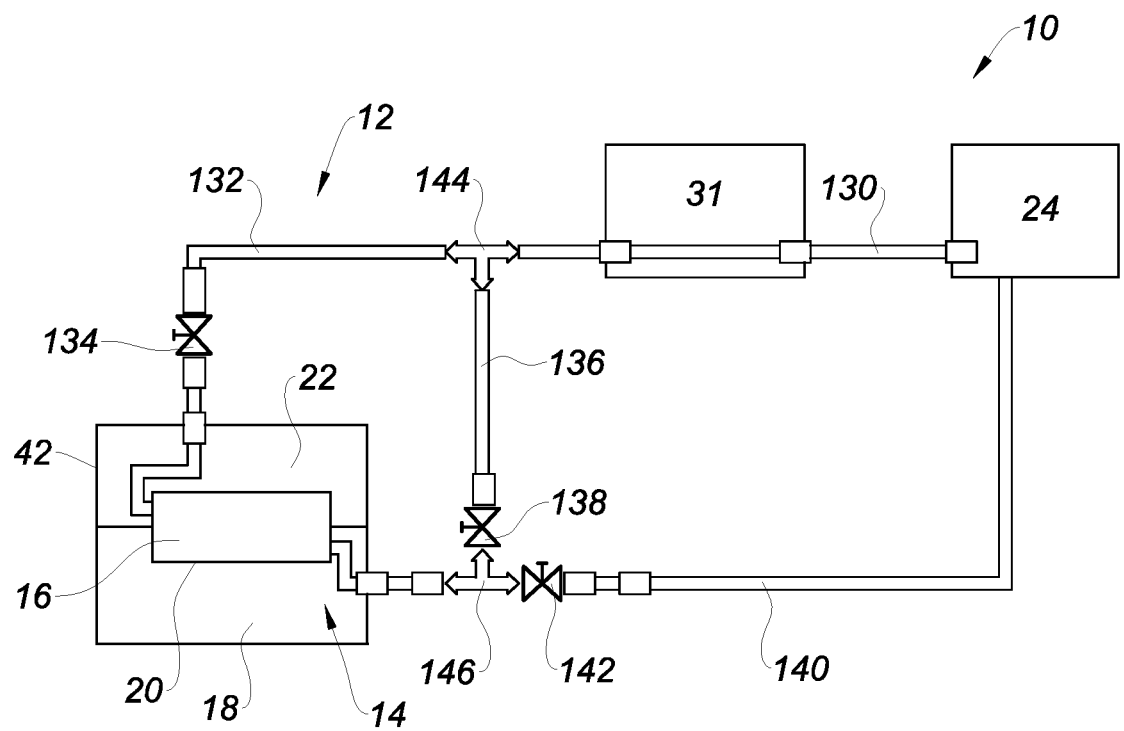

(51) Int. Cl.
*B29C 45/82* (2006.01)
*B29C 45/02* (2006.01)
*B29C 70/54* (2006.01)
*B29L 31/08* (2006.01)
*B29C 45/46* (2006.01)

(52) U.S. Cl.
CPC ...... *B29C 70/546* (2013.01); *B29C 2045/465* (2013.01); *B29C 2945/7604* (2013.01); *B29C 2945/76498* (2013.01); *B29L 2031/082* (2013.01)

(56) References Cited

U.S. PATENT DOCUMENTS

| | | | | |
|---|---|---|---|---|
| 5,518,388 | A * | 5/1996 | Swenor | B29C 70/48 425/144 |
| 6,136,236 | A * | 10/2000 | Boccard | B29C 45/77 425/149 |
| 6,168,408 | B1 * | 1/2001 | Boime | B29C 70/48 264/40.3 |
| 2005/0205492 | A1 * | 9/2005 | Yusa | B29C 45/1701 210/757 |
| 2009/0053350 | A1 * | 2/2009 | Sevigny | B29C 43/58 425/149 |
| 2015/0174835 | A1 * | 6/2015 | Hansen | B29C 70/54 264/40.7 |

FOREIGN PATENT DOCUMENTS

| | | | | |
|---|---|---|---|---|
| JP | 02301415 | A * | 12/1990 | |
| JP | 11245275 | A * | 9/1999 | |
| JP | 2009143170 | A * | 7/2009 | |
| WO | WO-2013068666 | A1 * | 5/2013 | B29C 45/77 |

OTHER PUBLICATIONS

Machine Translation JPH02125709 (Year: 1990).*
Machine Translation WO201306866 (Year: 2013).*
Machine translation JP2009143170A (Year: 2009).*
Machine translation JP02301415A (Year: 1990).*
Machine translation JP11245275A (Year: 1999).*
Office Action received for Chinese Patent Application No. 201880013224.2, dated Dec. 23, 2020, 11 pages (2 pages of Partial English Translation and 9 pages of Office Action).

* cited by examiner

RESIN INJECTION REGULATOR, RESIN INJECTION CIRCUIT AND ASSOCIATED METHODS

CROSS-REFERENCE OF RELATED APPLICATION

This application is a non-provisional application which claims the benefit of U.S. Provisional Application No. 62/457,106, filed Feb. 9, 2017, of which is herein incorporated by reference.

FIELD OF THE INVENTION

The invention relates to a resin injection regulator for a resin injection circuit which is used for moulding a turbine engine composite part, to an injection circuit comprising such a regulator, to a method for controlling such a circuit, and to a production method implementing such a method.

PRIOR ART

The RTM moulding method, the initials of which are an abbreviation of the term "resin transfer moulding", is a well-known method for producing parts from composite materials based on resin-impregnated fibres, said materials having high resistance characteristics and a reduced mass.

In a known manner, such a method, when applied to a turbine engine part such as a fan blade, comprises a plurality of successive operations. The method starts with the production of the woven fabric of fibres to obtain a three-dimensional preform blank, then said blank is cut to obtain a preform which has substantially the shape of the blade which is to be obtained. Said preform is then arranged in an injection mould, which is closed again. Liquid resin is then injected whilst maintaining a pressure on the injected resin whilst the polymerisation of the part is carried out by heating.

The resins used are very fluid resins which are able to penetrate the fibres of the preform easily, even when they are injected under reduced pressure. During polymerisation, under the effect of heat, the injected resin passes successively from the liquid state to the gel state and lastly to the solid state.

Maintaining the pressure on the resin is a key requirement, the aim of which is to ensure high-quality, flawless, non-porous parts. Since the resin tends to release gas during polymerisation, it is necessary to maintain the pressure of the resin until the polymerisation of the part is complete in order to prevent releases of gas from compromising the integrity of the resin.

In conventional RTM injection systems, it is known to maintain the pressure in the injection circuit by means of an injection cylinder which is connected to the circuit, which contains the resin, and which ensures the distribution and the pressurisation thereof. Once the resin has been injected, it is then necessary to keep the injection cylinder connected to the injection circuit in order to maintain the pressure in the mould until the polymerisation of the resin is complete.

Such systems have the disadvantage that they do not make it possible to reach high production speeds, since the down time of the injection cylinder in the injection circuit, during which said cylinder cannot be used in another injection circuit, naturally depends on the time taken for the polymerisation of the resin.

In addition, in a system of this type, there is a significant risk that the resin will polymerise inside the injection circuit, and this makes the operations of cleaning said circuit very difficult. In particular, if the circuit is not heated, the resin contained in the injection circuit between the mould and the injection cylinder can be made to polymerise before the resin contained in the mould, because the thickness of resin in the mould is greater. This setting of the resin in the injection circuit, besides making the cleaning of said circuit more difficult, also does not make it possible to ensure the transmission of the pressure exerted by the injection cylinder into the mould, and this results in flaws being present in the part.

In order to remedy these disadvantages, WO 2013/068666 has proposed a pressure-maintaining device for a circuit for injecting resin into a production mould, comprising firstly isolation valves which make it possible to isolate an injection cylinder upstream of the mould and a resin trap which is arranged downstream of the mould, and secondly pressurisation means which are capable of injecting a pressurised gas into pipes of the injection circuit which are located between said valves and the mould downstream and at the outlet of the mould. For this purpose, T-shaped ducts, which are interposed in the injection circuit between the isolation valves and the mould, are connected to a source of pressurised gas, and the circuit comprises vertical ducts which are intended to prevent the gas from reaching the mould. The injection cylinder can then be disconnected from the circuit whilst the pressure is maintained on the resin by the pressurisation means.

This design has the disadvantage that, in view of the fluidity of the resin, pressurised gas can nevertheless advance into the circuit and be injected into the mould in the form of bubbles, and can consequently lead to the appearance of flaws in the surface of the part. It is thus necessary to isolate the gas or any other fluid for pressurising the resin to be injected. In addition, an injection circuit comprising a pressure-maintaining device of this type is intended to make it possible to isolate the injection cylinder.

During the isolation of the injection cylinder, said cylinder is no longer able to carry out the function of carrying resin, and the injection circuit which is isolated is no longer able, on its own, to offer a resin carrying capacity which is capable of countering the reduction of the resin in the mould during the polymerisation thereof. This can thus lead to the appearance of gaps in resin in the finished part.

SUMMARY OF THE INVENTION

In this context, the invention is intended to offer a means which makes it possible to maintain the pressure in the injection circuit whilst preventing any risk of parasitic injection of gas into the injection circuit, and which further makes it possible to offer an additional resin carrying capacity which is capable of countering the phenomenon of reduction of resin in the mould during the polymerisation thereof.

For this purpose, the invention proposes a resin injection regulator which is intended to be arranged in a resin injection circuit in a mould for producing a composite part, and in particular a turbine engine composite part. Said injection regulator is characterised in that it comprises at least one vessel which is connected to said circuit and inside of which a movable wall means can be moved in a sealed manner, said movable wall means defining in said vessel a first cavity, forming a container for accumulation of resin, which is designed to be connected to at least one part of said circuit, and a second cavity which is designed to be connected to a source of pressurised fluid, said movable wall means being designed to be urged by the pressurised fluid with which the second cavity is supplied in order to exert a pressure on the resin contained in the first cavity by isolating said resin from said fluid.

According to other features of the regulator:

the second cavity is designed to receive a pressurised gas, in particular nitrogen, according to a first embodiment of the regulator, the cavity is formed in a branch of said circuit, the movable wall means is formed by a sliding scraper having a diameter which corresponds to that of said branch, said sliding scraper defining in said branch a first portion, forming the container for accumulation of resin, and a second portion for pressurisation which is designed to be connected to the source of pressurised fluid, according to a second embodiment of the regulator, the cavity is formed in a tubular jacket, and the movable wall means comprises a sliding piston which can be moved in said tubular jacket, said piston defining in said tubular jacket a first chamber forming the first cavity and a second chamber for pressurisation forming the second cavity which is designed to be connected to the source of pressurised fluid, the jacket is designed in such a way that the first chamber can have a minimum initial volume which makes it possible to release an amount of resin which is at least equal to a variation of the volume of resin contained in said circuit part between a moment which occurs immediately after the injection of the resin into the circuit and the injection mould, and a moment which corresponds to a complete polymerisation of the resin in the injection mould, the regulator comprises a means for heating at least the first chamber and a means for monitoring the temperature of at least the first chamber, the injection regulator comprises:
  a tubular axial main body,
  the tubular jacket, which has the same axial length as the main body and is received in said main body,
  the piston, which has substantially the same diameter as the tubular jacket and comprises a means for dynamic sealing with said tubular jacket,
  a first cover, which is designed to close a first end of said main body and a first end of the jacket, and comprising a first duct for the passage of resin, which opens into said jacket,
  a second cover, which is designed to close a second end of said main body and a second end of the jacket, and comprising a second duct for the passage of fluid, which opens into said jacket, and
  first and second static sealing means which are interposed between said jacket and the first and second covers, the injection regulator comprises at least one heating element which is interposed between the jacket and the body, at least one means for measuring the temperature of the jacket, which is interposed between the jacket and the body, and at least some connection means of said heating element and of said measuring means, which pass through at least one of the first or second covers.

The invention also relates to a circuit for injecting resin into a mould for producing a composite part, in particular a turbine engine composite part, said mould being capable of receiving a preform which is to be impregnated with resin. In accordance with the invention, said circuit is characterised in that it comprises at least one injection regulator of one of the two above-described types, the first cavity of which is connected to at least one part of said circuit supplying said mould, and the second chamber of which is connected to a source of pressurised fluid.

According to other features from a first embodiment of the injection circuit:

the injection circuit comprises at least:
  one resin injection cylinder,
  one device for preheating resin,
  one injection mould comprising at least a first portion having a cavity which is capable of receiving the preform and at least a second portion which is capable of closing the cavity,
  the source of pressurised fluid,
  a first circuit branch connecting an outlet of the resin injection cylinder to an inlet of the device for preheating resin,
  a second circuit branch connecting an outlet of the device for preheating resin to an inlet of the injection mould by means of a primary opening/closing resin valve,
  a third circuit branch connecting an outlet of the device for preheating resin to an outlet of the injection mould by means of a secondary opening/closing resin valve,
  a fourth circuit branch connecting an outlet of the injection mould to the resin injection cylinder, by means of a tertiary opening/closing resin valve,
  at least a fifth circuit branch comprising an injection regulator, which is connected firstly to said circuit and secondly to the source of pressurised fluid by means of an opening/closing fluid valve.

the injection circuit comprises a single fifth circuit branch which is connected to an inlet of the device for preheating resin in parallel with the first circuit branch.

According to other features from a second embodiment of the injection circuit:

the injection circuit comprises at least:
  one resin injection cylinder,
  one injection mould comprising at least a first portion having a cavity which is capable of receiving the preform and at least a second portion which is capable of closing the cavity,
  one resin trap which is placed under vacuum by a vacuum pump,
  a first injection circuit part which connects the injection cylinder to the injection mould,
  a second injection circuit part which connects the injection mould to the resin trap,
  one device for preheating resin which is interposed in the first circuit part,
  one resin drain which is interposed between the resin injection cylinder and the device for preheating resin in the first circuit part,
  opening/closing resin valves which are interposed firstly in the first circuit part on both sides of the preheating device and upstream of the drain, and secondly in the second circuit part, making it possible to control the opening or the closure of said first and second circuit parts,
  two injection regulators which are connected respectively to the first and second circuit parts by the first ducts thereof,
  one source of pressurised fluid which is connected to the second ducts of the injection regulators, and
  opening/closing fluid valves which are arranged at the outlet of the source of pressurised fluid and at the inlet of the second ducts of the injection regulators, making it possible to control the fluid pressurisation of the injection regulators.

the first injection regulator is connected to the first circuit between an output valve of the preheating device and the mould, and the second injection regulator is connected to the second circuit between the mould and the resin trap placed under vacuum.

The invention also relates to a control method from the first embodiment of the injection circuit of the above-described type, characterised in that it comprises successively at least:
- one step during which the primary and tertiary opening/closing resin valves are opened, the secondary opening/closing resin valve is closed, and the resin injection cylinder is actuated,
- one step during which the secondary opening/closing resin valve is opened, and the opening/closing resin valve is closed,
- one step during which the opening/closing fluid valve of the source of pressurised fluid is opened, and
- one step during which the resin injection cylinder is disconnected.

The invention also relates to a control method from the second embodiment of the injection circuit of the above-described type, characterised in that it comprises successively at least:
- one step during which the closure of the opening/closing resin valve of the drain is verified, and the valves of the preheating device and of the resin trap placed under vacuum are opened until the resin appears in the resin trap placed under vacuum,
- one step during which the opening/closing resin valve of the resin trap placed under vacuum is closed,
- one step during which the source of pressure is connected to the injection regulators, the heating means of said regulators being activated,
- one step during which the opening/closing resin valve at the output of the preheating device is closed, and the opening/closing fluid valves supplying the injection regulators are opened, then during which the opening/closing fluid valve of the source of pressurised fluid is opened,
- one step during which the preheating device and the resin injection cylinder are disconnected, and during which said device and cylinder are cleaned before the polymerisation of the resin, and
- one step during which the pressure of fluid in the pressure regulators is maintained for a defined period, in particular for a period of polymerisation of the resin in the injection mould.

The invention lastly relates to a method for producing a composite part, in particular a turbine engine composite part from a preform which is impregnated with resin in a mould supplied by a resin injection circuit of the above-described type, characterised in that it comprises:
- a first step of introducing the preform into an injection mould and closing said injection mould,
- a second step of implementing one or the other of the above-described injection circuit control methods, and
- a third step of extracting the part from the mould.

Figure 2:
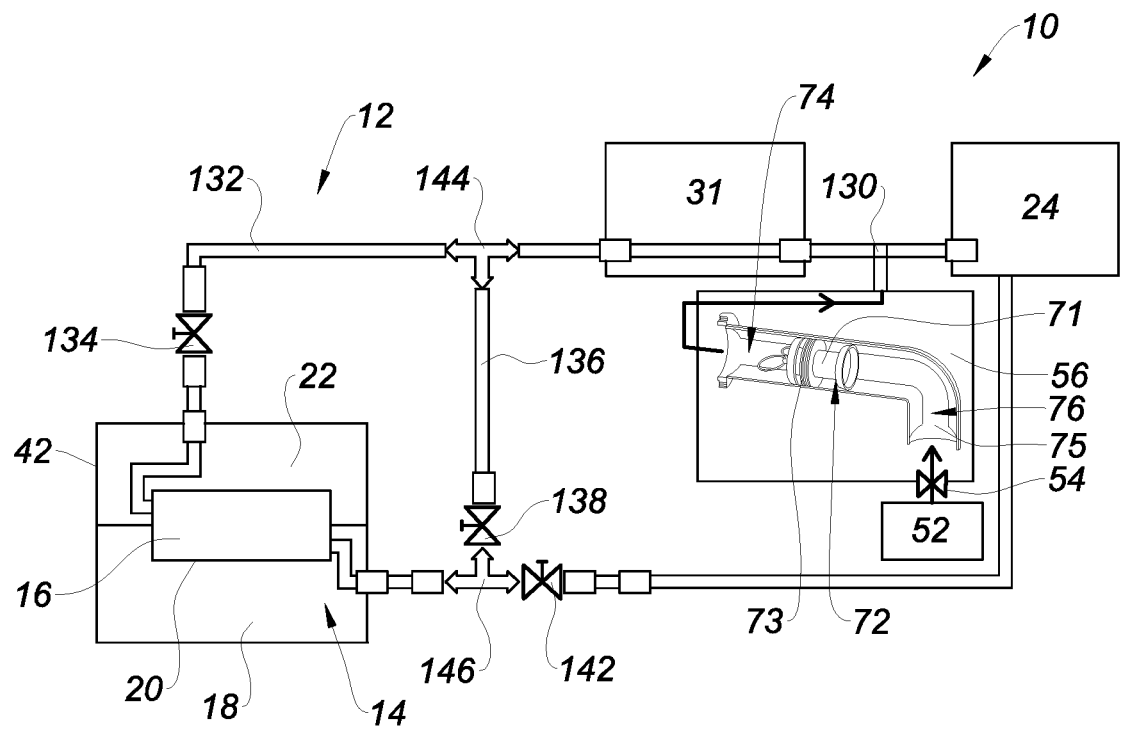
Figure 3:
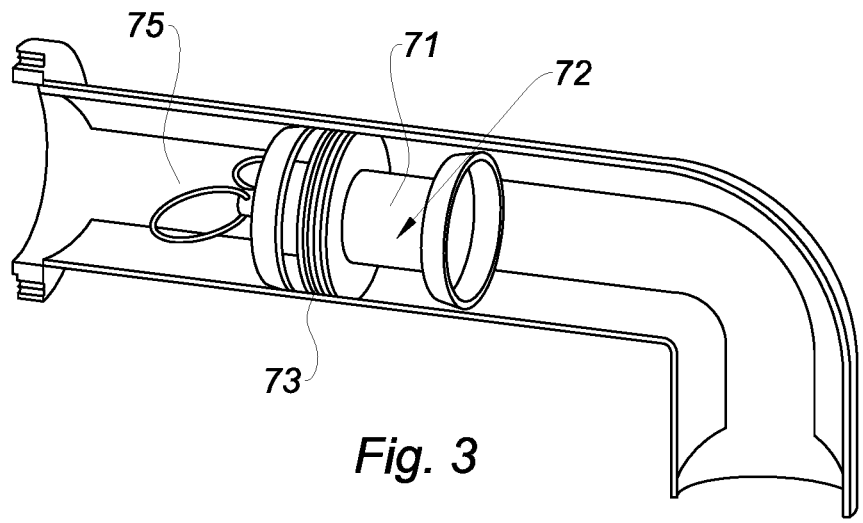
Figure 4:
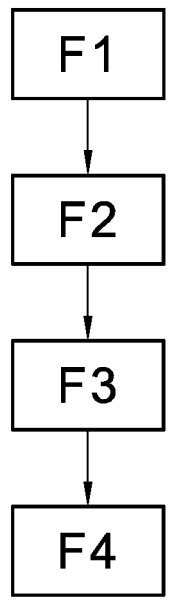
Figure 5:
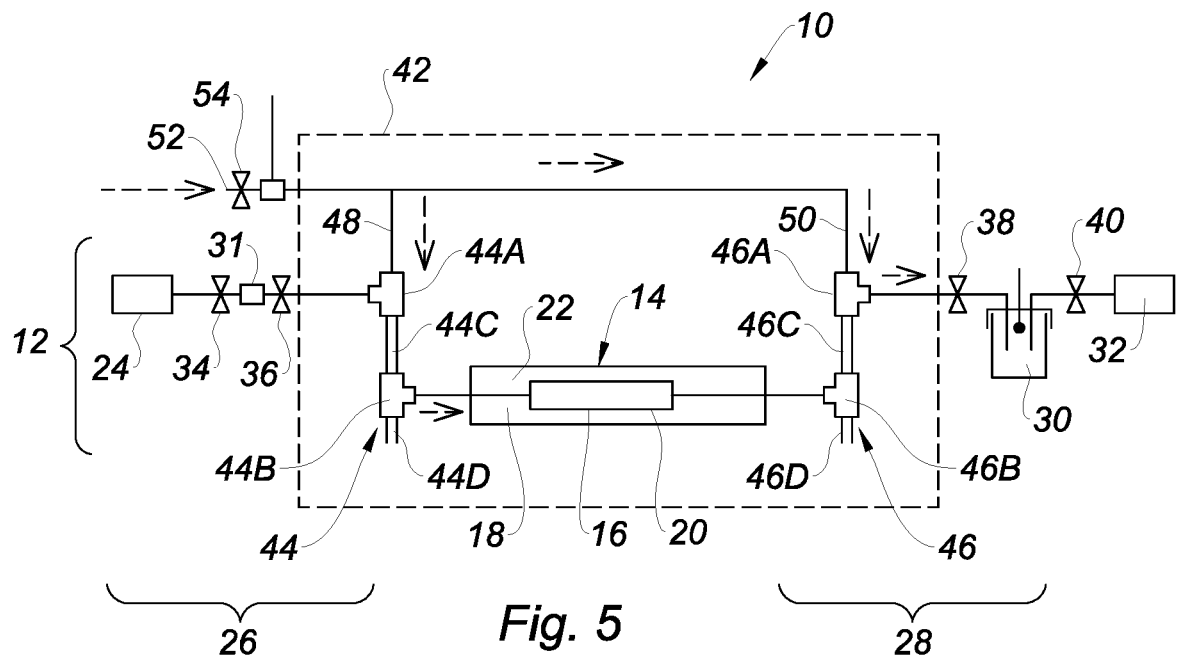
Figure 6:
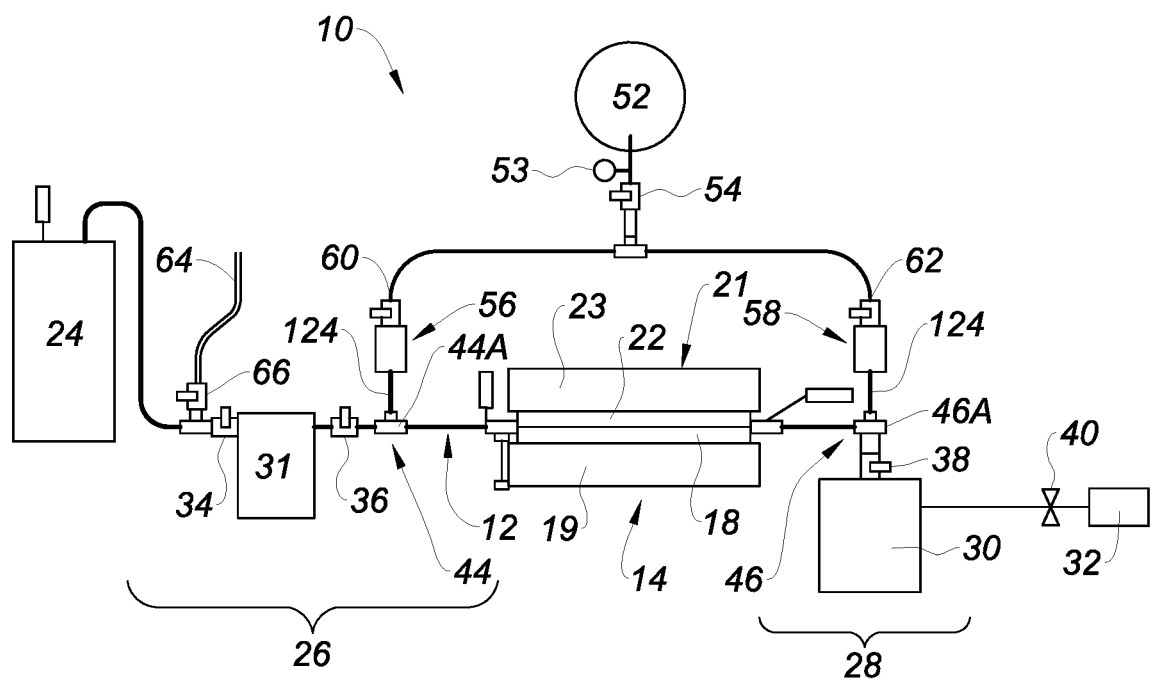
Figure 7:
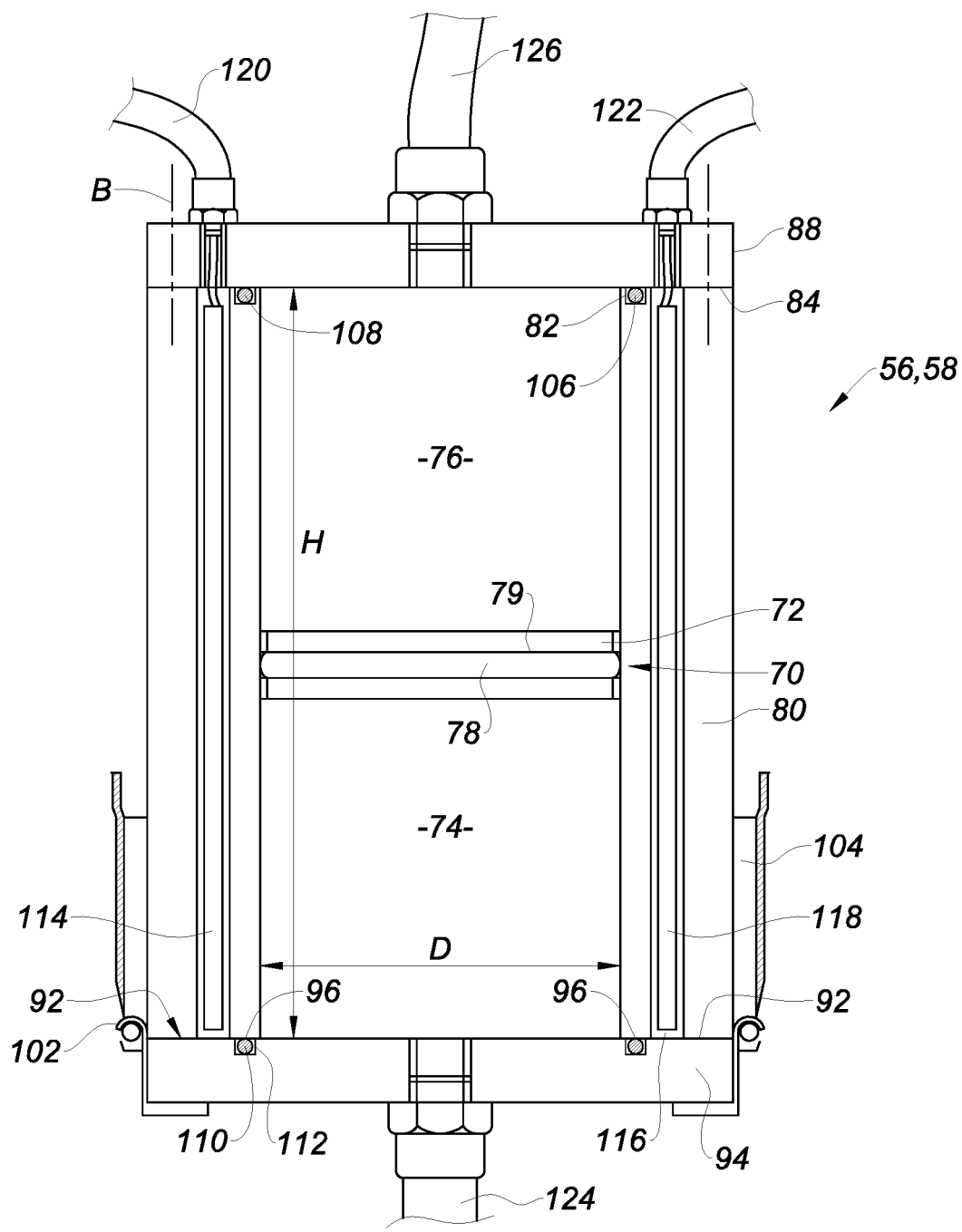
Figure 8:
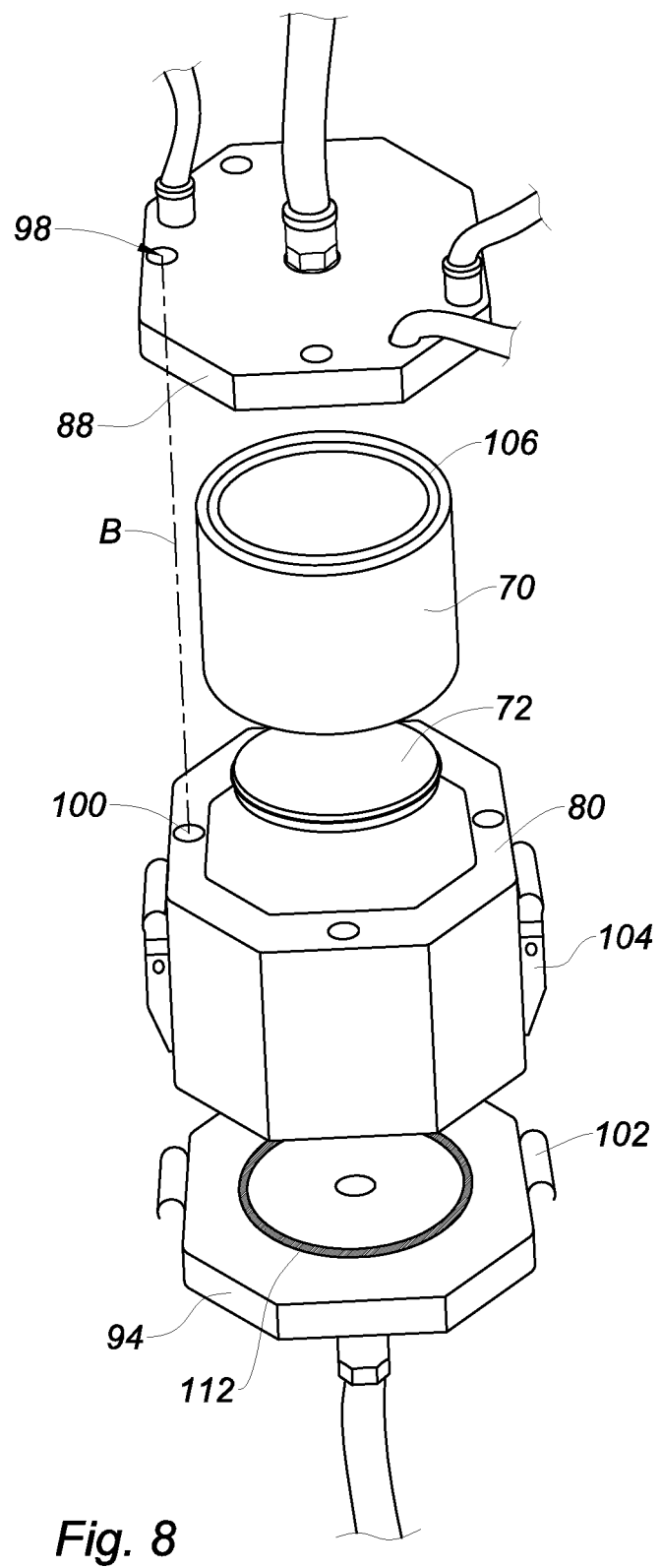
Figures 9, 10:
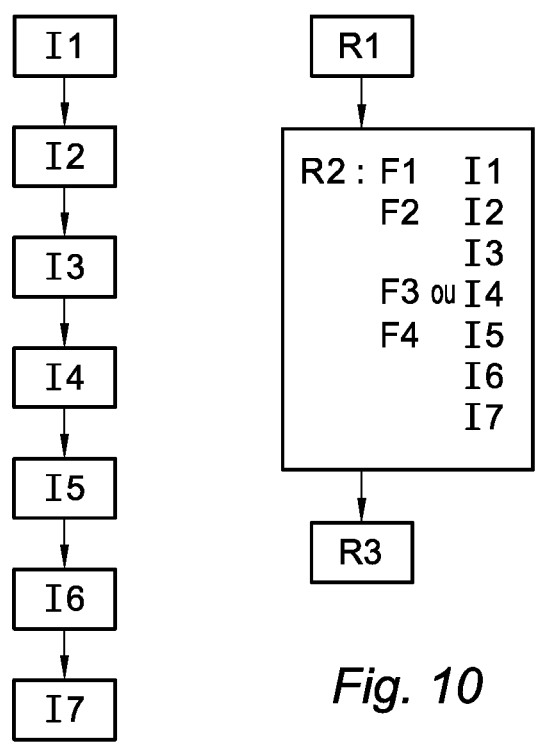

The invention will be better understood, and other details, features and advantages of the present invention will become clearer upon reading the following description, given by way of non-limiting example with reference to the accompanying drawings, in which:

FIG. 1 is a schematic view of an injection circuit and of a mould according to a first piece of prior art, FIG. 2 is a schematic view of an injection circuit according to a first embodiment of the invention, FIG. 3 is a schematic view of a resin injection regulator according to the first embodiment of the invention, FIG. 4 is a block diagram showing the steps of a method for controlling an injection circuit according to the first embodiment of the invention, FIG. 5 is a schematic view of an injection circuit and of a mould according to a second piece of prior art, FIG. 6 is a schematic view of an injection circuit and of a mould according to a second embodiment of the invention, FIG. 7 is a schematic, sectional view of a resin injection regulator according to the second embodiment of the invention, FIG. 8 is a perspective, exploded view of a resin injection regulator according to the second embodiment of the invention, FIG. 9 is a block diagram showing the steps of a method for controlling an injection circuit according to the second embodiment of the invention, FIG. 10 is a block diagram showing the steps of a method for producing a turbine engine part according to the invention.

In the following description, same reference numerals denote parts which are the same or have similar functions.

FIG. 1 shows a RTM injection installation 10 according to a first piece of prior art.

In a known manner, the RTM injection installation 10 comprises an injection circuit 12 and a mould 14 which are intended to produce a part such as a turbine engine fan blade from a woven preform 16. The mould 14 comprises in particular a lower portion 18 having a cavity 20 which is intended to receive the preform 16, which is preferably produced by weaving composite fibres in three dimensions, such as carbon fibres, and to enclose said preform 16 in said mould 14 by closing an upper portion 22 of said mould 14 onto the lower portion 18 in order to inject into said mould 14 a polymer resin which makes it possible to impregnate the fibres of the preform 16.

The elements of the injection circuit 12 will be described from upstream to downstream with respect to the direction of flow of the resin in the circuit, that is to say from the right to the left of FIG. 1.

In a known manner, the injection circuit 12 comprises at least one resin injection cylinder 24, which is intended to supply the circuit 12 with resin and to subject said resin to a defined pressure which makes it possible to inject said resin through the circuit 12 and into the mould 14.

The injection circuit 12 comprises, downstream of the resin injection cylinder 24 and upstream of the mould 14, in a conventional manner, a device for preheating resin 31 which is interposed in the circuit 12 in order to make it possible to preheat the resin before the injection thereof into the mould 14. The mould 14 is further placed in an oven 42, as shown in FIG. 1, or in a variant (not shown), under a hot press.

To connect these elements, the circuit 12 comprises a first circuit branch 130 connecting an outlet of the resin injection cylinder 24 to an inlet of the device 31 for preheating resin. The circuit 12 also comprises a second circuit branch 132 connecting an outlet of the device 31 for preheating resin to an inlet of the injection mould 14 by means of a primary opening/closing resin valve 134, a third circuit branch 136 connecting an outlet of the device 31 for preheating resin to an outlet of the injection mould 14 by means of a secondary opening/closing resin valve 138, and a fourth circuit branch 140 connecting an outlet of the injection mould 14 to the resin injection cylinder 24 by means of a tertiary opening/closing resin valve 142.

In order to simplify the connections between the different branches of the circuit 12, the second and third branches 132, 136 are connected to one another at the outlet of the reheating device 31 by a T-shaped connection 144, and the third and fourth branches 136, 140 are connected to one another at the outlet of the mould 14 by a T-shaped connection 146.

In this configuration, the injection of resin into the mould 14 is carried out successively in a plurality of steps. During a first step F1, the primary and tertiary opening/closing resin valves 134, 142 are opened, and the secondary opening/closing resin valve 136 is closed, and the resin injection cylinder 24 is actuated. The resin passes through the heating device 31, passes through the first circuit branch 132, fills the mould 14, leaves the mould 14 and goes back into the resin injection cylinder 24.

Then, during a step F2, the tertiary opening/closing resin valve 142 is closed, and the secondary opening/closing resin valve 138 is opened, and the pressure in the circuit 12 is maintained by means of the resin injection cylinder 24 until the resin polymerises in the mould 14.

As a result, the resin contained in the mould 14 is kept under pressure, and this makes it possible in principle to prevent the appearance of flaws relating to porosity in the final part, the maintenance of the pressure making it possible to prevent the resin from releasing gas.

However, it has been noted that this design has some disadvantages.

Firstly, it has been noted that it was necessary to circulate a large amount of resin through the mould 14 and through the first and third branches 132, 140 during the first step F1 before managing to eliminate every bubble of gas in the circuit 12. Furthermore, this objective is not necessarily achieved, since bubbles can nevertheless remain in the second branch 136, which bubbles can be driven into the mould during the second step F2.

The presence of these bubbles in the circuit 12 can lead to deposits of gas bubbles on the surface of the preform 16, which results in the appearance of flaws in the finished part.

Secondly, it has been noted that, during the polymerisation of the resin in the mould 14, said resin was subjected to a phenomenon of reduction in the mould 14 and thus in the first and second branches of the circuit 132, 136. Consequently, the resin contained in said branches could be insufficient to absorb the shortfall of resin in the mould 14, thus creating flaws in the finished part.

Thirdly, the second step F2 is a long-duration step, which has the disadvantage of immobilising the injection cylinder 24 in order to maintain the pressure in the resin circuit 12, even if it could be used in another RTM injection installation.

It is thus important to propose a new design of an injection circuit 12 which makes it possible, firstly, to keep the first and second branches 132, 136 of the circuit under pressure without having to immobilise the injection cylinder 24 and makes it possible, secondly, to provide an improved supply of resin which is intended to overcome the consequences of the reduction of the resin in the mould 14.

For this purpose, the invention proposes a new design of an injection circuit 12 for a RTM injection installation 10 comprising at least one injection regulator 56 which makes it possible to maintain the resin pressure in the circuit 12 instead of the injection cylinder 24.

FIG. 3 shows a first embodiment of an injection regulator 56 of this type.

Generally, an injection regulator 56 according to the invention comprises at least one vessel which is to be connected to the circuit 12, and inside of which a movable wall means 72 can be moved in a sealed manner. Said movable wall means 72 defines in the vessel a first cavity 74, forming a container for accumulation of resin, which is designed to be connected to at least one part of the circuit 12, and a second cavity 76 which is designed to be connected to a source of pressurised fluid 52. The movable wall means 72 is designed to be urged by the pressurised fluid supplied by the source of pressurised fluid 52 to the second cavity 76 in order to exert pressure on the resin contained in the first cavity whilst isolating said resin from said gas.

More particularly, in said first embodiment of an injection regulator 56, the vessel is formed by a branch of the circuit 12. The movable wall means 72 is formed by a sliding scraper 72 having a diameter which corresponds to an internal diameter of said branch, and is received in said branch.

The sliding scraper 72 is a similar scraper to the scrapers which are well known from the prior art. Generally, a scraper 72 comprises a central shaft 71 on which sealing cups 73 are mounted in such a way that they are arranged in contact with the internal wall 75 of the branch, and in so doing, ensure the mobility of the scraper 72 when it is subjected to the pressure supplied by the source of pressurised fluid 52.

The sliding scraper 72 defines in the branch a first portion 74, forming the first cavity which forms a container for accumulation of resin, and a second portion 76 forming the second cavity which is designed to be connected to the source of pressurised fluid 52.

Preferably, the pressurised fluid with which the second portion 76 is supplied is a pressurised gas, in particular nitrogen.

In the preferred embodiment of the invention, the circuit 12 comprises a single pressure regulator 56 which is designed to be arranged in parallel with the first branch 130 of the circuit. The branch of the regulator 56 is itself preferably also produced, as shown in FIG. 2, in the form of a fifth circuit branch which is connected firstly to an inlet of the device 31 for preheating resin in parallel with the first circuit branch 130, and secondly to the source of pressurised gas 52 by means of an opening/closing fluid valve 54.

It will be understood that this configuration is not intended to limit the invention. In particular, the fifth branch of the regulator could be connected at another point of the circuit 12, provided that it is able to subject the circuit 12 to a resin pressure which is sufficient to allow the replacement of the injection cylinder 24 as the source of pressure. It will also be understood that the circuit 12 could comprise more than one regulator of the type of the regulator 56.

In this configuration, an injection circuit 12 comprising an injection regulator 56 can be controlled, as previously, according to a first step F1 during which the primary and tertiary opening/closing resin valves 132, 142 are opened, the secondary opening/closing resin valve 138 is closed, and the resin injection cylinder 24 is actuated to fill the mould 14. During this step L1, the resin injection cylinder 24 fills the first portion 74 of the regulator 56 with liquid resin.

Then, similarly to in the method known from the prior art, during one step F2, the secondary opening/closing resin valve 138 is opened, and the tertiary opening/closing resin valve 142 is closed. The resin is then placed under pressure throughout the circuit by the resin injection cylinder 24.

The method then comprises a new step F3 during which the opening/closing fluid valve 54 of the source 52 of pressurised fluid is opened. As a result, the regulator 52 also subjects the resin of the circuit 12 to a pressure.

Advantageously, during a last step F4, the resin injection cylinder 24 is disconnected. The pressure is still maintained by the pressure regulator 56.

One particularly advantageous feature is that the regulator is formed by a fifth branch which can have a diameter which corresponds to the diameter of the other branches of the circuit. This configuration makes it possible to make good use of the mobility of the scraper 72 in the branches of the circuit. As a result of the phenomenon of reduction of the resin in the circuit, the scraper 72 can be made to leave the fifth branch and to enter the rest of the circuit, for example upstream of the preheating device 31, whilst still exerting a pressure on the resin in the circuit. It is thus ensured that the pressure is maintained on the resin in the circuit 12 at all times.

As has been seen, a pressure regulator according to the invention makes it possible to isolate a resin carrying capacity from a gas, said gas nevertheless subjecting the resin to a pressure without directly interfering therewith, by means of a movable wall. The most beneficial aspect of this configuration is that it improves RTM moulding installations 10 which are known from the prior art and already comprise means for pressurising resin, but which have the disadvantage of carrying out this pressurisation in manner which could be improved, the gas directly urging the resin.

FIG. 5 shows an example of a RTM injection installation 10 according to a second piece of prior art, comprising an injection circuit 12 and a mould 14 which are intended to produce a part such as a turbine engine fan blade from a woven preform 16. As above, the mould 14 comprises a lower portion 18 having a cavity 20 which is intended to receive the preform 16, which is preferably produced by weaving composite fibres in three dimensions, such as carbon fibres, and to enclose said preform 16 in said mould 14 by closing an upper portion 22 of said mould 14 onto the lower portion 18 in order to inject into said mould 14 a polymer resin which makes it possible to impregnate the fibres of the preform 16.

The elements of said injection circuit 12 will be described from upstream to downstream with respect to the direction of flow of the resin in the circuit, that is to say from the left to the right of FIG. 5.

In a known manner, the injection circuit 12 comprises at least one resin injection cylinder 24, which is intended to supply the circuit 12 with resin and to subject said resin to a defined pressure which makes it possible to inject said resin through the circuit 12 and into the mould 14.

The injection circuit 12 comprises, downstream of the resin injection cylinder 24 and upstream of the mould 14, a first circuit part 26, which thus connects the resin injection cylinder 24 to the mould 14. The injection cylinder 12 comprises, downstream of the mould 14, a second circuit part 28 connecting the mould 14 to a resin trap 30 which is intended to receive the excess resin escaping from the mould 14. Downstream of the resin trap 30, the injection circuit 12 comprises a vacuum pump 32 which is intended to keep the circuit 12 and the cavity 20 of the mould 14 under vacuum, and this makes it possible to remove every trace of air in the circuit and in the cavity 20, whilst sucking the resin through the circuit 12. The vacuum pump 32 thus makes it possible to facilitate filling the circuit 12 and the cavity 20 with the resin. Once the circuit 12 has been filled, the vacuum pump 32 draws the resin into the resin trap 30.

This configuration makes it possible, in a conventional manner, to ensure that the resin injected through the first circuit part 26 into the mould 14 is free from air bubbles in the mould 14, by monitoring the presence or absence of air bubbles in the resin leaving the mould 14, the presence or absence of air bubbles being monitored by examining the resin which is transported into the resin trap 30 by the second circuit part 28.

The injection circuit 12 further comprises, in a conventional manner, a device for preheating resin 31 which is interposed in the first circuit part 26 in order to make it possible to preheat the resin before the injection thereof into the mould 14. The device for preheating resin 31 can be isolated selectively from the circuit 12 by means of a first opening/closing resin valve 34, which is arranged upstream of the device for preheating resin 31, and by means of a second opening/closing resin valve 36, which is arranged downstream of the device for preheating resin 31.

Analogously, the injection circuit 12 comprises a third opening/closing resin valve 38, which is arranged upstream of the resin trap 30, and a fourth opening/closing resin valve 40, which is arranged downstream of the resin trap 30.

The mould 14 is further placed in an oven 42, as shown in FIG. 5, or in a variant (not shown), under a hot press.

The injection circuit 12 shown in FIG. 5 further comprises two pressure-maintaining devices 44 and 46, which are located on both sides of the injection mould 14. The devices 44 and 46 make it possible to apply a pressure to be maintained to the resin in the first and second circuit parts 26, 28.

The pressure-maintaining devices 44 and 46 are positioned respectively on the first circuit part 26 upstream of the injection mould 14 and on the second circuit part 28 downstream of the injection mould 14. The pressure-maintaining devices 44 and 46 according to the prior art are located in proximity to the injection mould 14, and more particularly as close as possible to the inlet and the outlet of the injection mould 14. When the RTM injection installation 10 is provided with an oven 42, said pressure-maintaining devices 44 and 46 can be placed in said oven 42. However, this configuration is problematic because the pressure-maintaining devices 44 and 46 do not comprise built-in means for regulating the temperature, the temperature being set, in the best case scenario, in a crude manner by the oven.

The pressure-maintaining devices 44 and 46 are also connected, by means of pipes 48, 50, to a source of pressurised gas 52 which is capable of injecting gas into the pipes 48, 50. For this purpose, an opening/closing fluid valve 54 is arranged at the outlet of the source of gas 52 to permit or interrupt the distribution of pressurised gas into the pipes 48, 50.

Each pressure-maintaining device 44, 46 is formed by a corresponding first T-connector 44A, 46A and by a second T-connector 44B, 46B, the two T-connectors being connected by a pipe 44C, 46C which is suitable for being pressurised.

The first and second T-connectors 44A, 44B of the pressure-maintaining device 44 which is interposed in the first part of the circuit 26 thus make it possible to introduce pressurised gas into the first part of the circuit 26 and thus make it possible to maintain a pressure on the resin in the circuit 12.

Thus, the first T-connector 44A of the first circuit part 26 makes it possible to urge the resin in the first circuit part 26, the pressurised gas being transported through the pipe 48 from the source of gas 52 as far as the first T-connector 44A of the first circuit part 26. Likewise, the first T-connector 46A of the second circuit part 28 makes it possible to urge the resin in the second circuit part 28, the pressurised gas being transported through the pipe 50 from the source of gas 52 as far as the first T-connector 46A of the second circuit part 28.

Each second T-connector 44B, 46B comprises an associated pressure sensor 44D, 46D which makes it possible to detect the start of polymerisation of the resin in the second T-connector 44B, 46B and, consequently, in the mould 14.

During the pressurisation of the injection circuit 12 by the devices 44, 46 which are both supplied by the source of gas 52, the pressurised gas enters through the upper portion of the T-connectors 44A, 46A so as to transmit the pressure to the preform 16. The injection cylinder 24 is further isolated from the first circuit 26 by means of the first and second opening/closing resin valves 34, 36.

As a result, the resin contained in the mould 14 is kept under pressure, and this makes it possible in principle to prevent the appearance of flaws relating to porosity in the final part.

However, it has been noted that this design has some disadvantages.

Firstly, as a result of the direct contact between the gas which is transported in the pressure-maintaining devices 44, 46 and the resin flowing in the first and second circuit parts 26, 28, there is a significant risk that gas bubbles will pass into the first and second circuit parts 26, 28 and into the mould 14, and this can lead to deposits of gas bubbles on the surface of the preform 16, which results in the appearance of flaws in the finished part.

Secondly, it has been noted that, during the polymerisation of the resin in the mould 14, said resin was subjected to the known phenomenon of reduction in the mould 14 and in the first and second circuit parts 26, 28, and that as a result, the resin contained in said first and second circuit parts 26, 28 could be insufficient to absorb the shortfall of resin in the mould 14, thus creating flaws in the finished part.

In this type of configuration, the invention also proposes a new design of an injection circuit 12 which makes it possible, firstly, to keep the first and second resin circuit parts 26, 28 under pressure whilst eliminating any risk of introducing gas, and makes it possible, secondly, to provide an improved supply of resin which is intended to overcome the consequences of the reduction of the resin in the mould 14.

For this purpose, the invention proposes a new design of the pressure-maintaining devices 44, 46 which comprises resin injection regulators 56, 58.

Similarly to in the first embodiment of the invention, each resin injection regulator 56, 58 makes it possible to maintain the pressure on the resin contained in the first or second circuit part 26, 28 to which it is connected, whilst further preventing any introduction of gas into said circuit part 26, 28. Furthermore, each resin injection regulator 56, 58 forms a resin carrying capacity which is capable of compensating for the reduction of the resin in the corresponding circuit part 26, 28 during the polymerisation thereof.

FIG. 6 shows a RTM injection installation 10 which is produced in accordance with a second embodiment of the invention. Similarly to the installation previously described with reference to the prior art, the RTM injection installation 10 comprises an injection circuit 12 and a mould 14 which are intended to produce a part such as a turbine engine fan blade. The mould 14 comprises in particular a lower portion 18 having a cavity (not shown) which is intended to receive a preform, and an upper portion 22 which is intended to be closed onto the lower portion 18. Said portions are for example arranged between the two lower 19 and upper 23 portions of a hot press 21.

The injection circuit 12 comprises a resin injection cylinder 24, which is intended to supply the circuit 12 with resin and to subject said resin to a defined pressure which makes it possible to inject said resin through the circuit 12 and into the mould 14.

The injection circuit 12 comprises, downstream of the resin injection cylinder 24 and upstream of the mould 14, a first circuit part 26, which thus connects the resin injection cylinder 24 to the mould 14. The injection cylinder 12 comprises, downstream of the mould 14, a second circuit part 28 connecting the mould 14 to a resin trap 30 which is intended to receive the excess resin escaping from the mould 14. The resin trap 30 is placed under vacuum, i.e. it comprises an internal vacuum pump (not shown) which is intended to suck the resin through the circuit 12 to draw it into the resin trap 30.

The injection circuit 12 also comprises a device for preheating resin 31 which is interposed in the first circuit part 26 in order to make it possible to preheat the resin before the injection thereof into the mould 14, and which can be isolated selectively from the circuit 12 by means of a first opening/closing resin valve 34, which is arranged upstream of the device for preheating resin 31, and by means of a second opening/closing resin valve 36, which is arranged downstream of the device for preheating resin 31.

The injection circuit 12 comprises a third opening/closing resin valve 38, which is arranged upstream of the resin trap 30.

The injection circuit 12 shown in FIG. 6 further comprises two pressure-maintaining devices 44 and 46 located on both sides of the injection mould 14. As described previously, the devices 44 and 46 make it possible to apply a pressure to be maintained to the resin in the first and second circuit parts 26, 28.

The pressure-maintaining devices 44 and 46 are positioned respectively on the first circuit part 26 upstream of the injection mould 14 and on the second circuit part 28 downstream of the injection mould 14. The pressure-maintaining devices 44 and 46 are located in proximity to the injection mould 14, and more particularly as close as possible to the inlet and the outlet of the injection mould 14.

By contrast with the embodiment which is previously known from the prior art, said pressure-maintaining devices 44 and 46 comprise the injection regulators 56 and 58 which are connected by pipes 48, 50 to a source of pressurised fluid 52, in this case a source of pressurised gas 52.

Preferably, the first injection regulator 56 is connected to the first circuit part 26 between the second output valve 36 of the preheating device 31 and the mould 14, and the second injection regulator 58 is connected to the second circuit part 28 between the mould 14 and the resin trap 30 placed under vacuum by a vacuum pump 32.

The preferred embodiment of the invention shows a source of gas 52, but it will be understood that the injection regulators 56, 58 could be pressurised by means of a source of pressurised fluid of a different type, in particular a source of hydraulic pressure. The gas used in the present case is preferably nitrogen.

Similarly to the previous configuration, an opening/closing fluid valve 54 is arranged at the outlet of the source of gas 52 to permit or interrupt the distribution of pressurised gas into the pipes 48, 50. A pressure-measuring device 53 such as a manometer makes it possible to measure the pressure at the outlet of the source of gas 52.

Each pressure-maintaining device 44, 46 comprises a first T-connector 44A, 46A which is interposed in the corresponding first or second circuit part 26, 28, and which is connected to the corresponding injection regulator 56, 58.

Opening/closing fluid valves 60, 62 are further arranged at the inlet of the injection regulators 56, 58 to monitor the gas pressurisation of said injection regulators 56, 58.

The injection circuit 12 further comprises a resin drain 64 which is interposed between the resin injection cylinder 24 and the device for preheating resin 31 in the first circuit part 26. The resin drain 64 is connected to the first circuit part 26 by means of a valve 66. If desired, the resin drain 64 makes it possible to visualise the entry of the resin into the first circuit part 26 as soon as the resin injection cylinder 24 has been activated.

One of the two resin injection regulators 56, 58 of the circuit 12 which is produced in accordance with the invention will now be described.

As shown in FIGS. 7 and 8, each injection regulator 56, 58 comprises at least one vessel which is formed by a tubular jacket 70, inside of which a movable wall means can be moved, which means is formed by a sliding piston 72 which defines, in the jacket 70, as shown in FIG. 7, a first cavity is formed by a first chamber 74 for accumulation of resin, which is designed to be connected to one of the circuit parts 26, 28, and a second cavity formed by a second chamber 76 for pressurisation, which is designed to be connected to a source of pressurised fluid, in this case the source of gas 52 described previously with reference to FIG. 6.

The piston 72 is designed to be urged by the pressurised gas occupying the second chamber 76, and to transmit said urging by exerting a pressure on the resin contained in the first chamber 74.

For this purpose, the piston 72 comprises a means for dynamic sealing with the internal wall of the tubular jacket 70, for example an O-ring seal 78 which is received in a groove 79.

The jacket 70 is designed in such a way that the first chamber 74 has a minimum initial volume which makes it possible to release an amount of resin which is at least equal to a variation of the volume of resin contained in the associated circuit part 26, 28 between the moment which occurs immediately after the injection of the resin into the circuit 12 and into the injection mould 14, and the moment which corresponds to a complete polymerisation of the resin in the injection mould 14.

This configuration is intended to ensure that the jacket 70 of each injection regulator 56, 58 is capable of providing a minimum resin carrying capacity which makes it possible to assist with absorbing the reduction of the resin contained in the mould 14 during the polymerisation thereof, together with the jacket 70 of the other injection regulator.

This configuration primarily results from a size of the jacket 70 which makes it possible, firstly, to propose a first chamber 74 having a minimum resin storage capacity which is compatible with an initial volume of the second chamber 76 which can make it possible to exert a gas pressure on the piston 72 with sufficient efficacy. It will thus be understood that this configuration translates into an adequate size of the jacket 70 relative to the internal diameter D and the length H thereof. In practice, during the pressurisation of the jacket 70, the first chamber 74 has a resin storage capacity which corresponds to the internal volume of the jacket 70, which is close to the volume of the piston 72, the piston 72 being arranged at the upper end of the jacket 70, and the volume of the second chamber 72 being minimal.

In the preferred embodiment of the invention, each injection regulator 56, 58 comprises a means for heating at least the first chamber 74 and a means for monitoring the temperature of said first chamber 74.

Said heating means can be arranged in a compact manner around the jacket 70, as will be seen with reference to a particularly compact arrangement of the injection regulator 56, 58 which has been shown in FIG. 10.

As shown in FIGS. 7 and 8, each injection regulator 56, 58 preferably comprises a tubular main body 80, in which the jacket 70 is received. FIG. 4 shows a tubular main body 80 having a hexagonal shape, but it will be understood that this design is not intended to limit the invention. It should be noted advantageously that the jacket 70 is preferably secured against rotation in the tubular main body 80. The jacket 70 receives the piston 72.

The tubular jacket 70 has the same axial length H as the tubular main body 80. As a result, faces of the ends 82, 96 of the jacket 70 are aligned in the same planes as the faces of the corresponding ends 84, 92 of the tubular main body 80.

The tubular main body 80 is closed at a first end 92 by a first cover 94, which as a result also closes a first end 96 of the tubular jacket 70.

Likewise, the tubular main body 80 is closed at a second end 84 by a second cover 88, which as a result also closes a second end 82 of the tubular jacket 70.

Likewise, the second cover 88 is fixed to the body 80 by means of screws having axes B (not shown), which pass through piercings 98 in the second cover 88 and which are received in threads 100 in the body 80.

In a manner which is not intended to limit the invention, the first cover 94 is fixed to the body 80 by means of hooks 102, which extend on both sides of the first cover 94 and which are held by attachment devices 104 extending on both sides of the body 80. It will be understood that any other fixing means which is known from the prior art can be suitable for properly fixing the first cover 84 to the body 80.

A first static sealing means 110, in particular an O-ring seal 110, is interposed between the jacket 70 and the first cover 94. For example, said O-ring seal 108 is received in a groove 112 which is formed in the first cover 94.

A second static sealing means 106, in particular an O-ring seal 106, is interposed between the jacket 70 and the second cover 88.

For example, said O-ring seal 106 is received in a groove 108 which is formed at the second end 90 of the jacket 70.

In order to provide the heating of at least the first chamber, the injection regulator 56, 58 comprises, as shown in FIG. 7, at least one heating element 114 which is interposed between the jacket 70 and the body 80.

Advantageously, it is possible to make good use of the hexagonal shape of the body 80 to accommodate heating elements 114 between the body 80 and the jacket 70. It will be understood that a different shape of the body 80 would also make it possible to insert heating elements 114, as long as a sufficient radial clearance is formed between said body 80 and the jacket 70.

The heating elements 114 are for example formed by heater strips or cartridge heaters, which are accommodated in cavities 116 which are formed between the jacket 70 and the body 80.

Each injection regulator 56, 58 comprises at least one means for measuring the temperature of the first chamber 74. Said measuring means is shown in FIG. 7 in the form of a probe 118 which is accommodated in a cavity 116, but it will be understood that this configuration is not intended to limit the invention. The probe 118 can consist of a thermocouple.

Advantageously, connection means of the heating element 114 and of the measuring means 118 pass through the second cover 88. Said connection means can consist of cables 120 and 122. Said connection means could equally pass through the first cover 94 without changing the nature of the invention.

The first cover 94 comprises a first duct 124 for the passage of resin which opens into the first chamber 74 of the jacket 70. Likewise, the second cover 88 comprises a second duct 126 for the passage of fluid which opens into the second chamber 76 of the jacket 70.

In this configuration, each injection regulator 56, 58 can be used in the resin injection circuit 12 by connecting the first chamber 74 thereof to the corresponding circuit part 26 or 28 by means of the first duct 124 thereof, and the second chamber 76 thereof to the source of pressurised gas 52 by means of the second duct 126 thereof.

In this configuration, as shown in FIG. 9, the injection circuit 12 can be controlled according to a method having steps which will be described hereinafter.

The method for controlling the injection circuit 12 can firstly have a first step 11 of draining, during which the opening/closing resin valve 66 of the drain 64 is opened until the resin coming from the injection cylinder 24 appears in the drain 64. However, this step is not indispensable.

Then, during a second step 12 of the method, the opening/closing resin valve 66 of the drain 64 is closed, or the closure thereof is verified, and the first and second opening/closing resin valves 34, 36 of the preheating device 31 are opened, and the opening of the third opening/closing resin valve 38 of the resin trap 30 is verified, until the resin, which is sucked by the vacuum pump 32, appears in the resin trap 30.

Then, during a third step 13 of the method, the third opening/closing resin valve 38 of the resin trap 30 is closed. The resin pressure increases as the circuit 12 and the cavity are loaded with resin.

Then, during a fourth step 14 of the method, the source of gas 52 is connected to the injection regulators 56, 58, and the heating means of the regulators 56, 58, i.e. the heating elements 114 described previously, are activated.

Then, during a fifth step 15, the second opening/closing resin valve 36 of the preheating device 31 is closed, the opening/closing fluid valves 60, 62 which are arranged at the outlet of the source of pressurised gas 52 and at the inlet of the injection regulators 56, 58 are opened, then the opening/closing fluid valve 54 of the source of pressurised gas 52 is opened. At that moment, the pressure regulators 56, 58 exert and maintain a pressure on the resin contained in the first and second circuit parts 26, 28. As a result of the prior closure of the second opening/closing resin valve 36 of the preheating device 31, the regulators 56, 56 do not exert pressure on the resin contained in the preheating device 31 or on the injector 24.

During a sixth step 16, the resin pressure being maintained in the injection circuit 12 by the pressure regulators 56, 58, the preheating device 31 and the resin injection cylinder 24 are disconnected in order to be cleaned before the resin contained therein polymerises.

The full advantage of the design according to the invention can be seen here, which design makes it possible to maintain the pressure in the injection circuit 12 whilst making it possible to disconnect the preheating device 31 and the resin injection cylinder 24 in order to allow the cleaning thereof before the resin polymerises. Furthermore, this design advantageously makes it possible to reuse the preheating device 31 and the resin injection cylinder 24 in another injection circuit even before the resin has polymerised in the mould 14 which was the subject of the previous injection.

The gas pressure in the regulators 56, 58, and thus the pressure that said regulators exert on the injection circuit 12, is maintained during a seventh step 17, the duration of which corresponds to the duration of polymerisation of the resin.

Whichever embodiment of the invention is selected, as shown in FIG. 10, it is thus possible to implement, in a very simple manner, a method for producing a turbine engine composite part from a preform which is impregnated with resin in a mould 14 of the type described previously. This production method has a first step R1 of introducing the preform 16 into an injection mould 14 and of closing the mould 14, a second step R2 of implementing the steps F1 to F4 or 11 to 17 of the methods for controlling the injection circuit 12 which have been described previously, and a third step of extracting R3 the finished part from the mould 14.

The invention thus advantageously makes it possible to improve the production quality of the turbine engine composite parts whilst increasing production speeds.

The invention claimed is:

1. A resin injection circuit comprising a mould for producing a composite part, at least one resin injection cylinder able to feed with resin said mould, and at least one resin injection regulator connected to said circuit,
   wherein said resin injection cylinder can be disconnected from the said resin injection circuit, and
   wherein said resin injection regulator comprises at least one vessel which is connected to said circuit and inside of which a movable single solid wall can be moved in a sealed manner, said movable single solid wall having a first face defining in said vessel a first internal cavity, forming a container for accumulation of resin, which is designed to be connected to at least one part of said resin injection circuit, said movable single solid wall having a second face opposite to said first face and defining in said vessel a second internal cavity which is designed to be connected to a source of pressurised fluid of said resin injection circuit, said movable single solid wall being designed to be urged directly by the pressurised fluid being injected in the second internal cavity and coming from the source of pressurized fluid so that movable single solid wall exert a pressure on the resin contained in the first internal cavity by isolating said resin from said fluid, said pressure being configured to maintain a resin pressure in said circuit whilst the resin injection cylinder is disconnected.

2. The resin injection circuit according to claim 1, wherein the second cavity of the resin injection regulator is designed to receive a pressurised gas.

3. The resin injection circuit according to claim 1, wherein the vessel of the resin injection regulator is formed by a branch of said resin injection circuit, the movable single solid wall forms a sliding scraper having a diameter which corresponds to that of said branch, said sliding scraper defining in said branch a first cavity which is formed by a first portion of said branch, forming the container for accumulation of resin, and a second cavity which is formed by a second portion for pressurising said branch which is designed to be connected to the source of pressurised fluid.

4. The resin injection circuit according to claim 1, wherein the cavity of the resin injection regulator is formed in a tubular jacket and in that the movable single solid wall is movable in said tubular jacket, said movable single solid wall defining in said tubular jacket a first chamber forming the first cavity and a second chamber for pressurisation forming the second cavity which is designed to be connected to the source of pressurised fluid.

5. The resin injection circuit according to claim 4, wherein the jacket of the resin injection regulator is designed in such a way that the first chamber can have a minimum initial volume which makes it possible to release an amount of resin which is at least equal to a variation of the volume of resin contained in said circuit part between a moment which occurs immediately after the injection of the resin into the circuit and the injection mould, and a moment which corresponds to a complete polymerisation of the resin in the injection mould.

6. The resin injection circuit according to claim 4, wherein the resin injection regulator comprises a means for heating at least the first chamber and a means for monitoring the temperature of at least the first chamber.

7. The resin injection circuit according to claim 4, wherein the resin injection regulator comprises:
   a tubular axial main body,
   the jacket, which has the same axial length (H) as the main body and is received in said main body,
   the movable single solid wall, which has the same diameter as the tubular jacket and comprises a seal for dynamic sealing with said tubular jacket,
   a first cover, which is designed to close a first end of said main body and a first end of the jacket, and comprising a first duct for the passage of resin, which opens into said jacket,
   a second cover, which is designed to close a second end of said main body and a second end of the jacket, and comprising a second duct for the passage of fluid, which opens into said jacket,
   first and second static sealing means which are interposed between said jacket and the first and second covers.

8. The resin injection circuit according to claim 7, wherein the resin injection regulator comprises a means for heating at least the first chamber and a means for monitoring the temperature of at least the first chamber, at least one heating element which is interposed between the jacket and the body, at least one means for measuring the temperature of the jacket, which is interposed between the jacket and the body, and at least some connection means of said heating element and of said measuring means, which pass through at least one of the first or second covers.

9. The resin injection circuit according to claim 1, wherein it comprises further:
   one device for preheating resin,
   a first circuit branch connecting an outlet of the resin injection cylinder to an inlet of the device for preheating resin,
   a second circuit branch connecting an outlet of the device for preheating resin to an inlet of the injection mould by means of a primary opening/closing resin valve,
   a third circuit branch connecting an outlet of the device for preheating resin to an outlet of the injection mould by means of a secondary opening/closing resin valve,
   a fourth circuit branch connecting an outlet of the injection mould to the resin injection cylinder, by means of a tertiary opening/closing resin valve,
   at least a fifth circuit branch comprising an injection regulator, which is connected firstly to said circuit and secondly to the source of pressurised fluid by means of an opening/closing fluid valve,
   and wherein the injection mould comprises at least a first portion having a cavity which is capable of receiving a preform to be impregnated with resin aimed at producing the composite part and at least a second portion which is capable of closing the cavity.

10. The resin injection circuit according to claim 9, wherein it comprises a single fifth circuit branch which is connected to an inlet of the device for preheating resin in parallel with the first circuit branch.

11. The resin injection circuit according to claim 4, wherein it comprises further:
    one resin trap which is placed under vacuum by a vacuum pump,
    a first injection circuit part which connects the injection cylinder to the injection mould,
    a second injection circuit part which connects the injection mould to the resin trap,
    one device for preheating resin which is interposed in the first circuit part,
    one resin drain which is interposed between the resin injection cylinder and the device for preheating resin in the first circuit part,
    opening/closing resin valves which are interposed firstly in the first circuit part on both sides of the preheating device and upstream of the drain, and secondly in the second circuit part, making it possible to control the opening or the closure of said first and second circuit parts,
    two injection regulators which are connected respectively to the first and second circuit parts by the first ducts thereof,
    one source of pressurised fluid which is connected to the second ducts of the injection regulators,
    opening/closing fluid valves which are arranged at the outlet of the source of pressurised fluid and at the inlet of the second ducts of the injection regulators, making it possible to control the fluid pressurisation of the injection regulators,
    and wherein the injection mould comprises at least a first portion having a cavity which is capable of receiving a preform to be impregnated with resin aimed at producing the composite part and at least a second portion which is capable of closing the cavity.

12. The resin injection circuit according to claim 11, wherein the first injection regulator is connected to the first circuit part between the second output valve of the preheating device and the mould, and in that the second injection regulator is connected to the second circuit part between the mould and the resin trap placed under vacuum.

13. A method for controlling an injection circuit according to claim 10, wherein it comprises successively at least:
    one step (F1) during which the primary and tertiary opening/closing resin valves are opened, the secondary opening/closing resin valve is closed, and the resin injection cylinder is actuated,
    one step (F2) during which the secondary opening/closing resin valve is opened, and the tertiary opening/closing resin valve is closed,
    one step (F3) during which the opening/closing fluid valve of the source of pressurised fluid is opened,
    one step (F4) during which the resin injection cylinder is disconnected.

14. A method for controlling an injection circuit according to claim 12, wherein it comprises successively at least:
    one step during which the closure of the opening/closing resin valve of the drain is verified, and the opening/closing resin valves of the preheating device and of the resin trap placed under vacuum are opened until the resin appears in the resin trap placed under vacuum, one step during which the opening/closing resin valve of the resin trap placed under vacuum is closed, one step during which the source of pressure is connected to the injection regulators, the heating means of said regulators being activated, one step during which the opening/closing resin valve at the output of the preheating device is closed, and the opening/closing fluid valves supplying the injection regulators are opened, then during which the opening/closing fluid valve of the source of pressurised fluid is opened, one step during which the preheating device and the resin injection cylinder are disconnected, and during which said device and cylinder are cleaned before the polymerisation of the resin, one step during which the fluid pressure in the pressure regulators is maintained for a defined period, in particular for a period of polymerisation of the resin in the injection mould.

15. A method for producing a turbine engine composite part from a preform which is impregnated with resin in a mould supplied by a resin injection circuit according to claim 10, wherein it comprises:
 a first step (R1) of introducing the preform into an injection mould and closing said injection mould,
 a second step (R2) of implementing the method of claim for controlling the injection circuit,
 a third step (R3) of extracting the part from the mould.

16. A method for producing a turbine engine composite part from a preform which is impregnated with resin in a mould supplied by a resin injection circuit according to claim 1, wherein it comprises:
 a first step (R1) of introducing the preform into an injection mould and closing said injection mould,
 a second step (R2) of implementing the method of claim 14 for controlling the injection circuit,
 a third step (R3) of extracting the part from the mould.

* * * * *